US006417849B2

(12) United States Patent
Lefebvre et al.

(10) Patent No.: US 6,417,849 B2
(45) Date of Patent: *Jul. 9, 2002

(54) SINGLE LOGICAL SCREEN IN X WINDOWS WITH DIRECT HARDWARE ACCESS TO THE FRAME BUFFER FOR 3D RENDERING

(75) Inventors: Kevin T. Lefebvre; Don B. Hoffman; Jeffrey Joel Walls; Derek J. Lukasik, all of Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 39 days.

(21) Appl. No.: 09/127,773

(22) Filed: Jul. 31, 1998

(51) Int. Cl.[7] ............................................. G06T 15/00
(52) U.S. Cl. ............................ 345/419; 345/4; 345/733
(58) Field of Search ................. 345/419, 329, 345/330, 331, 332, 418, 4, 733, 755, 516

(56) References Cited

U.S. PATENT DOCUMENTS 4,903,218 A * 2/1990 Longo et al. ............... 364/521
5,073,933 A * 12/1991 Rosenthal ................... 345/340
5,408,602 A * 4/1995 Giokas et al. ............... 345/457
5,748,189 A * 5/1998 Trueblood ................... 345/331
5,844,553 A * 12/1998 Hao et al. .................... 345/329
5,859,651 A * 1/1999 Potu .............................. 345/526
6,088,005 A * 7/2000 Walls et al. .................... 345/4

* cited by examiner

Primary Examiner—Cliff N. Vo
Assistant Examiner—Huedung X. Cao

(57) ABSTRACT

Single Logical Screen and Direct Hardware Access in a 3D environment are combined by passing a single stream of protocol to the X Server, which in turn passes the information to multiple 3D rendering processes for display on individual screens (monitors). Multiple instances of a single daemon implement the rendering processes. The X Server communicates with an instance of the daemon functioning as a master daemon, which in turn controls the remaining instances functioning as slave daemons. All daemons communicate through common shared memory segments. This achieves both efficiency and performance, since duplicated distribution of commands and data is avoided. Each of the daemons is driven by the contents of the shared memory segments. To facilitate this, an X Client, the X Server and the daemons are all interconnected with separate control and data paths.

20 Claims, 6 Drawing Sheets

SINGLE LOGICAL SCREEN IN X WINDOWS WITH DIRECT HARDWARE ACCESS TO THE FRAME BUFFER FOR 3D RENDERING

BACKGROUND OF THE INVENTION

The X Windows System (hereinafter called simply "X") is the standard windowing system used for Unix workstations. It is prized for its flexibility concerning configuration issues, as well as its ability to display images over a network.

Just as a human organization that conducts or attends events scheduled on a calendar finds it convenient (even necessary!) to require there to be one master calendar administered by a single authority empowered to resolve conflicts, a windowing system for a computer needs one agency that determines where the windows are located, which ones are totally or partially obscured, and that generally administers the rules for window operations. X is no exception, and each workstation has a server, called the "X Server", or by some people simply "Capital X", that acts as the controlling agency for the window system. Applications that desire to create or destroy a window, display data in a window, take data from the keyboard, or take data from the existing content of a window, are called clients, and they request services from Capital X through calls to a library, such as Xlib. The slogan is "Capital X owns the frame buffer", and it implies that nothing is displayed unless the X Server put it into the frame buffer.

X supports a feature set concerning multiple monitors connected to a workstation. This is useful with certain applications that involved either a large amount of data or several disparate types of data. (An example is an integrated circuit design and simulation package where one window contains a high level definition of the circuit's functionality, one contains a description of the resulting device level implementation, one contains a simulated waveform display for that device level implementation, and one contains a definition of simulation parameters, such as supply voltage, clock frequency, etc.) Originally, a window could neither span two or more monitors nor be moved between them at will; it had to be displayed as a complete item within the screen of a single monitor selected in advance. A recent extension to X was the development of Single Logical Screen, or SLS. SLS allows specific arrangements of two, three or four monitors (and their associated frame buffers) to cooperate as if they were one giant monitor and frame buffer within which windows can be arbitrarily positioned and re-positioned, even if they span the physical boundaries of the actual component monitors and frame buffers.

The SLS scheme described above offers adequate performance for 2D operations. Top of the line 3D graphics packages (say, PEX and OpenGL) cooperate with hardware graphics accelerators that expect to write their output images directly to the frame buffer themselves. To facilitate this, a mode of operation called Direct Hardware Access (DHA) was added as an extension to non-SLS X. Through a registration process an "accelerated window" can be defined wherein the 3D libraries themselves can find out the location of the frame buffer and write directly to it. An additional communication path between the application and Capital X keeps track of housekeeping issues, such as obscured regions. This scheme works well, but does not deal with a multiplicity of monitors and their frame buffers. At present, 3D applications render to SLS windows using a virtual memory driver, which is unacceptably slow. It would be desirable if 3D applications could use the DHA mechanism for accelerated windows in the SLS environment.

Notice of Patent Incorporated by Reference, etc.

The subject matter of the present application may be viewed as an extension of that disclosed in an allowed but not yet issued Patent Application bearing Ser. No. 08/584,755, entitled A DESIGN AND METHOD FOR A LARGE, VIRTUAL WORKSPACE, filed by Walls, Elliot and Marks on Jan. 10, 1996 and assigned to Hewlett-Packard Co. That application concerns X Windows and the extension thereto that we have termed SLS, but does not contemplate what to do for systems having a graphics accelerator and wishing to use DHA. Nevertheless, it contains useful background information about X in general and specific implementation details concerning SLS in particular, and, since herein we extend SLS, is for that reason and the sake of brevity hereby incorporated by reference.

For further background information about the standard X Server, the reader is advised to consult a treatise such as THE X WINDOW SYSTEM SERVER by Elias Israel and Erik Fortune (1992, Digital Press, ISBN: 1-55558-096-3). For in-depth treatment about X in general, any of a variety of standard works from O'Reilly & Associates, Inc. are recommended. The following three books may also be of interest, each published by Addison-Wesley: OpenGL Programming for the X Window System, by Mark J. Kilgard (ISBN 0-201-48359-9); OpenGL Programming Guide, by Neider, Davis and Woo (ISBN 0-201-63274-8); and OpenGL Reference Manual, by the OpenGL Architecture Review Board (ISBN 0-201-632764).

SUMMARY OF THE INVENTION

A solution to the problem of combining SLS and DHA in a 3D environment is to pass a single stream of protocol to the X Server, which in turn passes the information to multiple 3D rendering processes for display on individual screens (monitors). Multiple instances of a single daemon implement the rendering processes. The X Server communicates with an instance of the daemon functioning as a master daemon, which in turn controls the remaining instances functioning as slave daemons. All daemons communicate through common shared memory segments. This achieves both efficiency and performance, since duplicated distribution of commands and data is avoided. Each of the daemons is driven by the contents of the shared memory segments. To facilitate this, an X Client, the X Server and the daemons are all interconnected with separate control and data paths.

DESCRIPTION OF A PREFERRED EMBODIMENT

Figure 1:
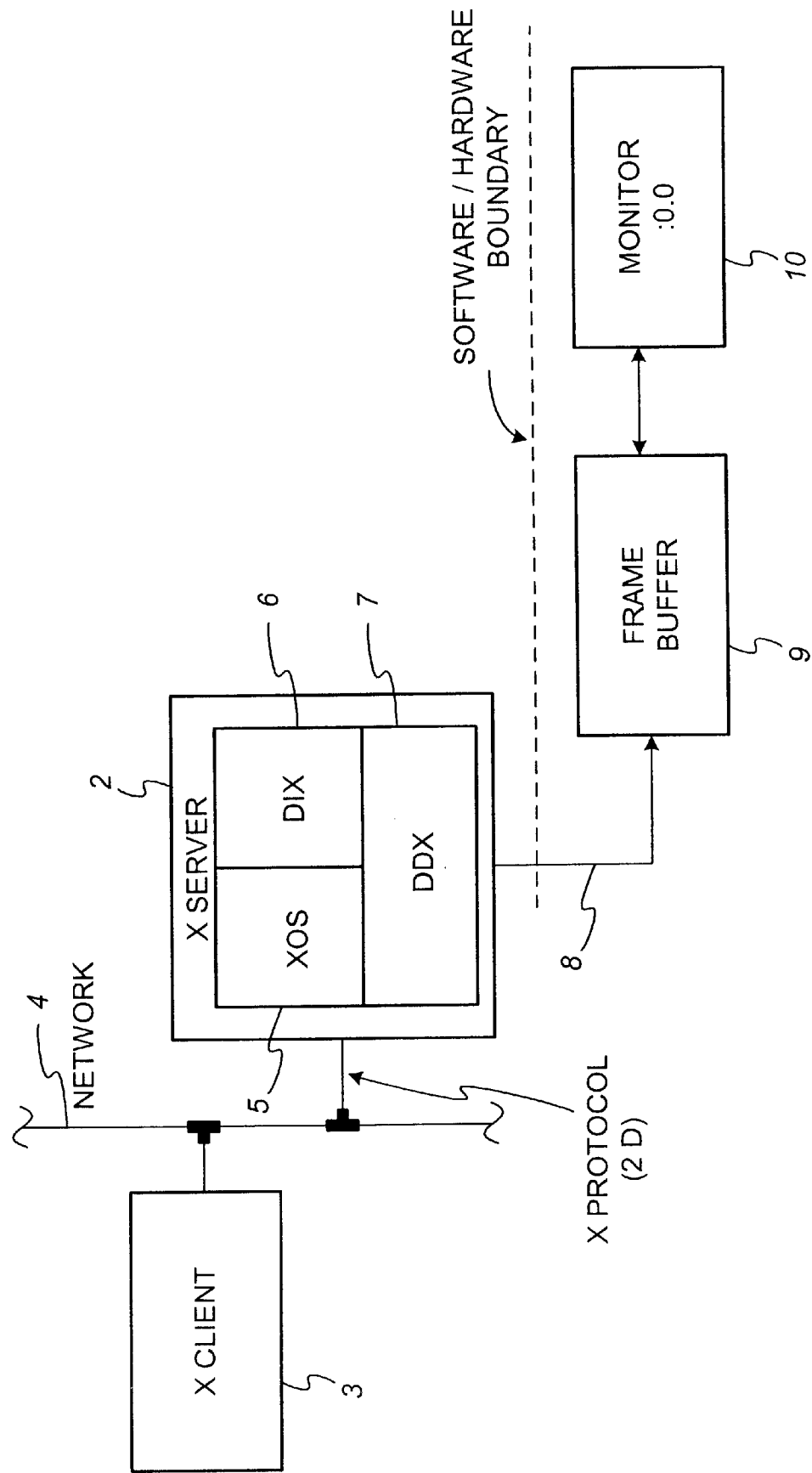
FIG. 1 is a simplified partial software block diagram of a prior art non-SLS X Window system.

Refer now to FIG. 1, wherein is shown a simplified block diagram representation 1 of a prior art X window computer system, an appreciation of which is useful in understanding the present invention. An X Server 2 is connected to an X Client 3 by a network 4 (i.e., Ethernet, IEEE 803) over which is transmitted (among other things) data and instructions expressed in X protocol, which is inherently 2D in nature. The Server 2 and the Client 3 are most productively thought of as software entities, and they may or may not execute on the same computing hardware. (If they do, then the networking layer is suppressed and cooperation is attained through the underlying IPC's—interprocess communication mechanisms—that are required, anyway.) The arrangement 1 is of the non-SLS variety, and the X Server 2 is coupled across the software/hardware boundary by a suitable (usually custom and specific to the manufacturer) interface to a frame buffer 9 that may contain an optional graphics accelerator. The frame buffer 9 drives a monitor 10, which in X talk we may describe as being ":0.0".

The X Server 2 may be briefly described as the combination of an XOS API 5 (an X Operating System Application Programming Interface) 5 cooperating with a Device Independent Layer (DIX) 6 which is another API that in turn cooperates with (think: "is implemented by") a Device Dependent Layer (DDX) 7. An API is simply a standard set of calls and parameters that is independent of the vendor and other variables, and that maps these into the specific environment at hand, say a particular vendor's UNIX. In this case the "OS" part of the XOS API is rudimentary, and is mapped into various parts of the UNIX kernel. It is the DDX 7 that communicates via a path 8 (using the unshown interface) with the frame buffer 9.

The arrangement 1 shown in FIG. 1 will be readily understood as conventional by those familiar with X. In conclusion, we may add that since the arrangement shown is a non-DHA version, the graphics information associated with the client 3 and expressed in the X protocol is probably 2D graphics, and that if the graphics accelerator is present it is a 2D accelerator. If the system were a non-DHA 3D graphics system it would be doggy slow.

Figure 2:
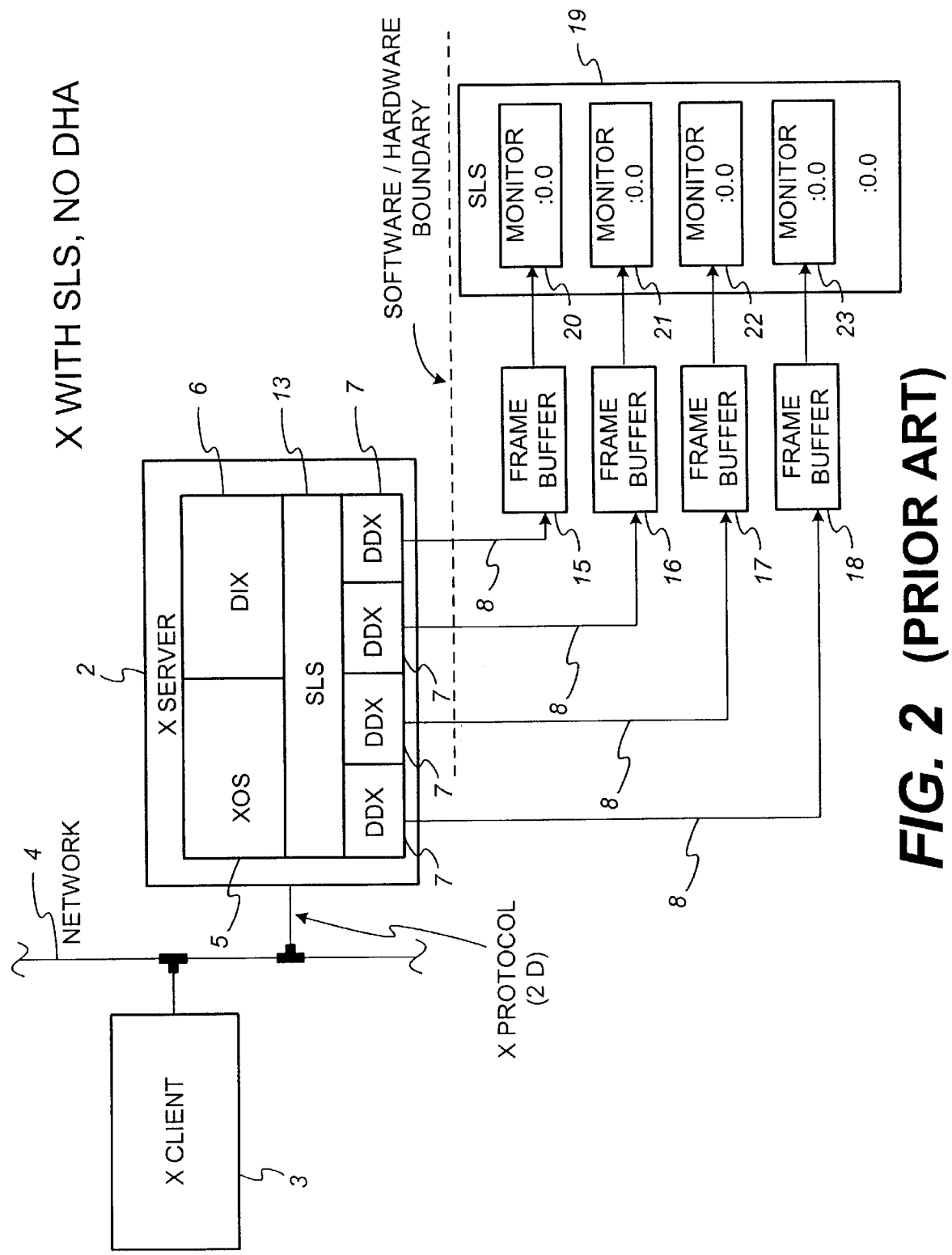
FIG. 2 is a simplified partial software block diagram of a prior art SLS X Window system.

Refer now to FIG. 2, wherein is shown a simplified prior art block diagram 11 that is essentially the extension to SLS of FIG. 1. Elements in FIG. 2 that correspond directly with counterparts in FIG. 1 are given the same reference numbers. As before, a (probably 2D) client 3 communicates via X protocol over a network 4 with an X Server 12. In this case, however, an instance of a Single Logical Screen 19 is composed of four (it could be two or three) physical screens (monitors) 20–23. Each monitor is driven by a corresponding frame buffer/accelerator (15–18). Each frame buffer/accelerator is controlled by a corresponding executing instance of DDX (14a–14d). Each instance of the DDX 14 is probably the same as the others, unless for some perverse reason one of the frame buffer/accelerators were so different as to require a different DDX.

An interface layer SLS 13 has been interposed between the various DDX's and the combination of XOS 5 with DIX 6. The SLS layer 13 intercepts any calls to DDX and transparently implements the notion of Single Logical Screen (SLS). See the incorporated Patent for a detailed explanation of how this is done. Note that in accordance with the magic of SLS the logical screen 19 remains :0.0 even though it is now physically composed of four separate frame buffers 15–18 and their associated monitors 20–23. As far as X is concerned, :0.0 is still just one place, but we know that it is now bigger.

Figure 3:
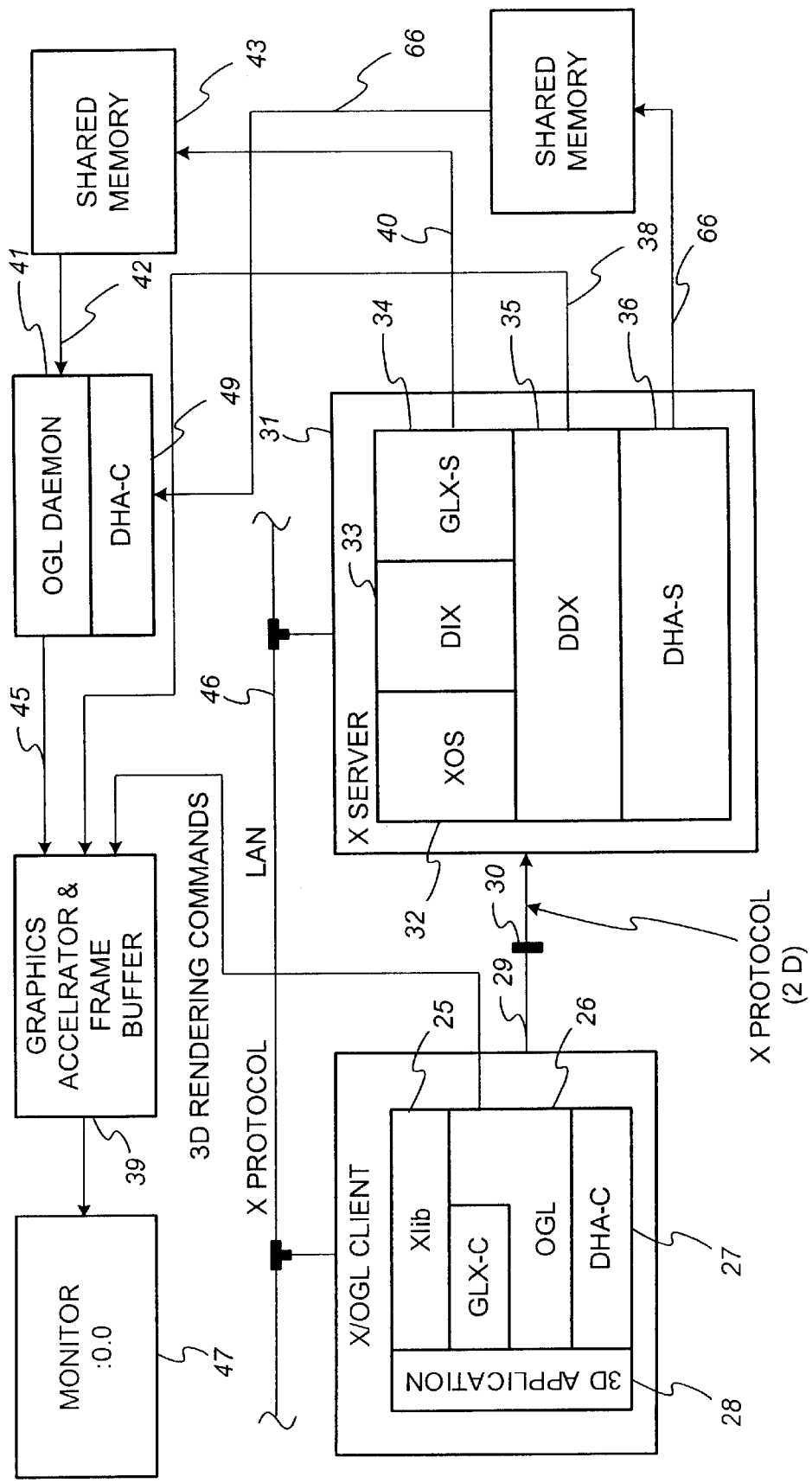
FIG. 3 is a simplified partial software block diagram of a prior art non-SLS X Window system incorporating DHA.

Refer now to FIG. 3, wherein is shown a simplified prior art block diagram 24 illustrating a non-SLS instance of X incorporating Direct Hardware Access (DHA) for use in a computing environment that runs a 3D application 28. What used to correspond to the X Client 3 of earlier figures is now the combination of a 3D application 28 and Xlib 25. (Those familiar with X will be familiar with Xlib.) In this block diagram 24 there is an X/OGL client 48 and an X Server 31, each of which we now show in somewhat greater detail. In particular, the X/OGL client 48 includes a 3D library, such as PEX, Starbase (from Hewlett-Packard Co.), PHIGS or OGL. (We shall use the designator "OGL" as an abbreviation for OpenGL, which identifies an API established by the Silicon Graphics Corporation.) In the present embodiment it is preferred that the module or mechanism 26 that cooperates with, or is responsive to, the 3D application 28 be OGL. As an API, or Application Programming Interface, it presents a known mix of commands and parameters that does not vary as a function of the vendor for the software or the underlying hardware. Whereas X is strictly a 2D mechanism, OGL addresses the incremental issues needed to deal with 3D. A GLX-C module 50 is essentially the X client extensions needed to ensure coordination between the X Server and OGL. If DHA were absent or non-applicable because the X Client and X server were executing on separate machines connected by a network 46, then X/OGL would expect to use a similarly extended X Server 31 to make things happen at the remote frame buffer using a GLX protocol. For performance reasons, the interesting case occurs when all this stuff is executing on the same machine, so we shall assume that there is no intervening network. Instead, path 29 (e.g., a pipe) carries traffic between the X/OGL Client 48 and X Server 31 using a suitable Inter-Process Communication mechanism (IPC) 30. (The existence and use of IPC's is well understood, and for the sake of brevity we will omit further representation and reference thereto, with the understanding that they are ubiquitous. To show all the IPC's in use in FIG. 3 would be to clutter it considerably.)

A Client DHA–C module 27, which is also an API, and whose existence is known to X/OGL, finds the name of the device file for the accelerator/frame buffer 39 using DHA-S 36. Thereafter, code executing in the X/OGL module 26 can initiate a transfer of data and instructions, belonging to or originating in the environment of the 3D application 28, directly to the accelerator/frame buffer 39. Since were are assuming that all the hardware is on the same machine, this means that the underlying operating system can perform the transfer using a high performance graphics bus. Such a transfer may be termed a "local" transfer, since there are no remote machines involved (other than the normal circumstance of the accelerator/frame buffer 39 being a "peripheral").

As for the augmented X Server 31, it now includes a GLX-S module 34, that is the implementation mechanism for the GLX-C part of the X/OGL Client API 48. Remote 3D rendering uses the services of an OGL Daemon 41 via software path 40 and the shared memory 43. In the figure as discussed the OGL Daemon 41 really only has much to do if the network 46 is in use, and no "local" transfers from OGL module 26 are possible. In such a case the X Server 31 has memory resources within itself into which the graphics data and associated instructions are transferred over the network 46. From the X Server 31 the data goes via shared memory 43 to the OGL Daemon 41. The OGL Daemon 41 uses DHA-C 49 and DHA-S 36 to establish a DHA connection for direct rendering by the OGL Daemon 41 to the frame buffer 39. To that end, it will be noted that the OGL Daemon (and the slave daemons to be mentioned in due course) contain within them programming that implements the OpenGL API (or other 3D library, if OpenGL is not in use).

The shared memory 60 contains various other kinds of useful information, such as window clip lists. The DHA-S 36 communicates this information to the OGL Daemon 41 via path 66.

As before, the monitor 47 displays the contents of the frame buffer, and it appears to X as the display :0.0.

It will be appreciated that there may well be multiple instances of the X/OGL Client 48 running on a single system. This situation arises naturally when a user runs a plurality of applications in a corresponding plurality of different windows. For each window that is to be the destination of 3D rendering there will be created a corresponding instance of shared memory 60.

Figure 4A:
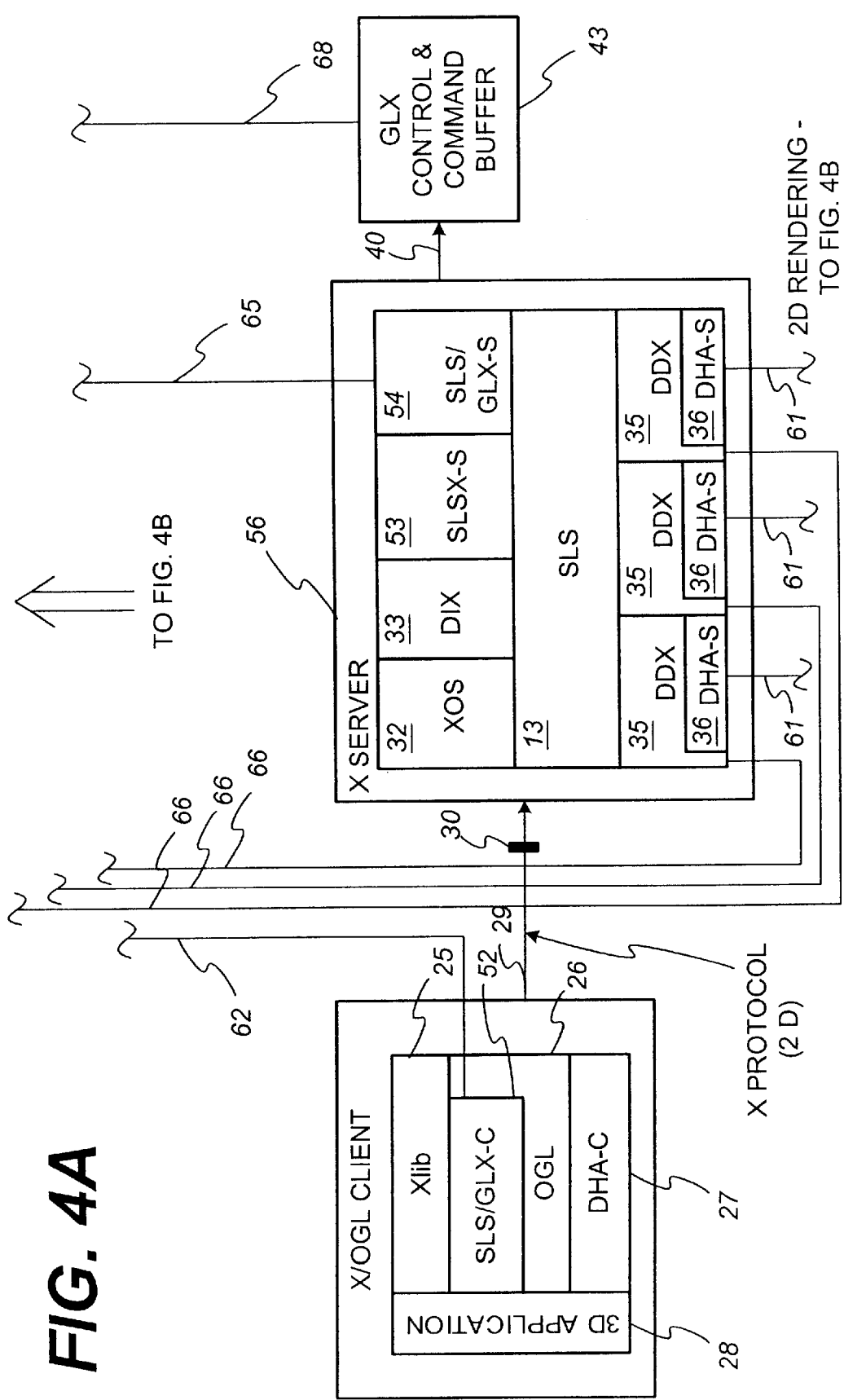
FIGS. 4A and 4B are a simplified partial software block diagram of a window system incorporating both SLS and DHA.
Figure 4B:
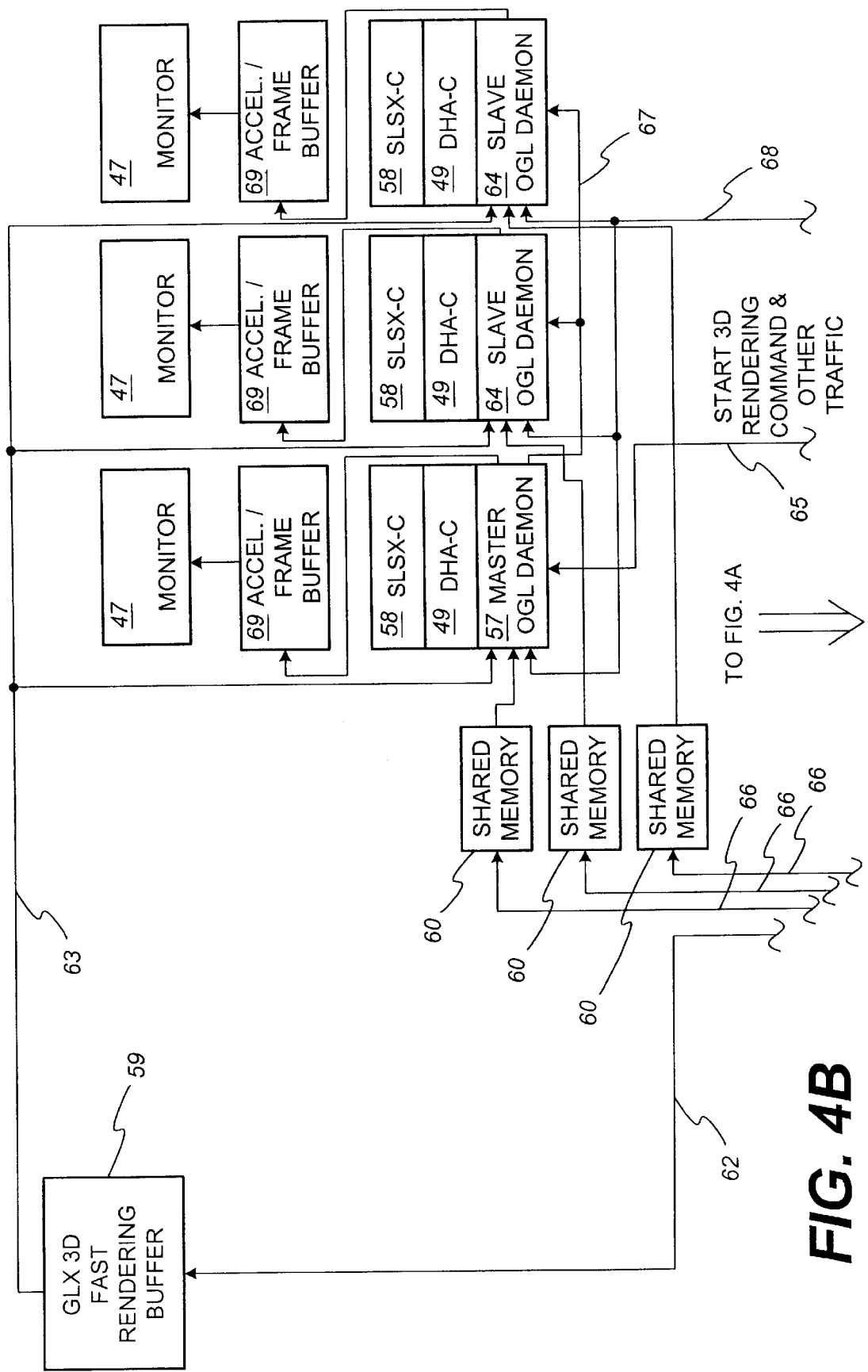

Refer now to FIG. 4, wherein is shown a software block diagram 51 of a 3D graphics system capable of rendering to a single logical screen (SLS) having three monitors 47 and using direct hardware access (DHA). As in FIG. 3, FIG. 4 depicts an X/OGL client 55, which is similar to client 48 in FIG. 3. The difference is that what was GLX-C 50 in FIG. 3 is now SLS/GLX-C 52. This change replaces the use of path 37 in FIG. 3 (which sent 3D rendering commands directly to the frame buffer 39) with path 62. Path 62 carries an encapsulated version (via GLX protocol) of those 3D rendering commands to a GLX 3D Fast Rendering Buffer 59, which is implemented as shared memory. The encapsulation is for the organization of the data inside the buffer 59, so that it may be easily extracted by instances 57 of the OGL Daemon via path 63.

The software block diagram 51 of FIG. 4 also includes an X/OGL Server 56 that is similar to the X/OGL Server 31 of FIG. 3. One difference is that X/OGL Server 56 has, after the fashion of FIG. 2, multiple instances of DDX 35, each of which contains a DHA-S 36. This supports a 2D SLS functionality for FIG. 4. Another difference is the replacement of GLX-S 34 (of FIG. 3) by SLS/GLX-S 54 and the addition of SLSX-S 53. SLSX-S 53 is an extension to the X Server which will be described in connection with FIG. 5.

It will be noted that a network connection between the X/OQL Client 55 and the X/OGL Server 56 has been omitted in favor of local path 29 and IPC 30. This is because performance considerations dictate that 3D application 28 and the multiple frame buffers 39 all be on the same machine.

Also note that connections 61 from the various DHA-S's 36 to the various instances of the frame buffers (39) supports the rendering of 2D images.

The mode of 3D SLS/DHA operation we are interested in describing is recognized and established by cooperation between a Master OGL Daemon 57 and SLS/GLX-S 54 via a GLX Control & Command Buffer 43 (as described later in connection with FIG. 5). (In the usual UNIX fashion, the first ever instance of running an X/OGL Client 55 results in the existence of an OGL Daemon, which then executes until later killed, if ever.) Once the 3D SLS/DHA mode has been recognized and established, and the client 55 has sent rendering commands to buffer 59, the SLS/GLX-C 52 portion of the client can request SLS/GLX-S 54 to issue a "start 3D rendering trigger" via path 65 to a Master OGL Daemon 57. In turn, Master OGL Daemon 57 issues 3D triggers over path 67 to Slave OGL Daemons 64, if their services are required.

The start 3D rendering trigger command on path 65 and its reappearance as 3D triggers on path 67 contain two pieces of information. The first tells the Master OGL Daemon 57 if it needs to propagate the trigger to any of the slave daemons 64. The second tells all of the daemons 57/64 which buffer (59 or 43) to take commands from. It will be appreciated that all of the daemons 57/64 are identical as to their code; each is capable of understanding if it is to operate as a master or a slave. There can be only one master.

Once the various daemons have received their various triggers they utilize paths 63 or 68 to access the sequence of control commands (from buffer 43) or rendering commands (from buffer 59) and pass the various rendering commands through to their respective instances of the frame buffers 39.

Figure 5:
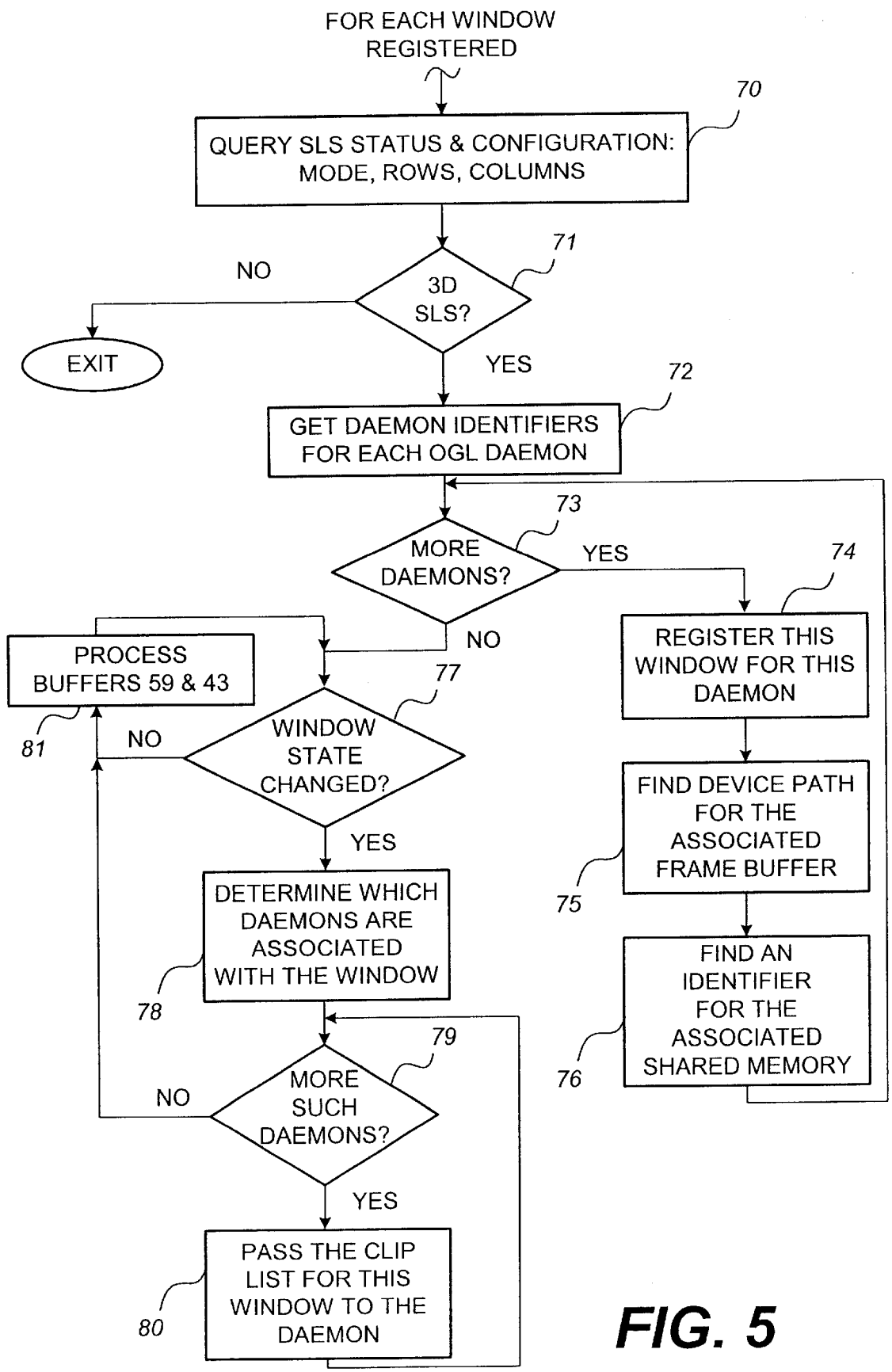
FIG. 5 is a simplified flow chart illustrating an aspect of the operation of the software block diagram of FIGS. 4A and B.

Refer now to FIG. 5, which is a simplified flow chart 69 that describes how the Master and Slave OGL Daemons (57/64) behave throughout their lifetimes, including how they establish their connections to the various shared memory segments 60 and to the frame buffers 61 using the SLSX-S 53 portion of X/OGL Server 56 (all in reference to FIG'S 4A/B). The activity depicted in flow chart 69 is either done by the Master Daemon 57 itself or is done by a Slave at the behest of the Master. At step 70 the SLS status and configuration is determined. If 3D SLS is in effect step 71 will subsequently branch to step 72; otherwise the flow chart 69 is exited. At step 72 daemon identifiers for each OGL Daemon are found. A daemon identifier is a variable whose value is kept both in the X/OGL Server and in the daemon itself, and is related to the manner in which SLS screen are labeled.

Step 73 begins a loop comprising steps 74, 75 and 76, and purpose is to establish the connection between the shared memory segments 60 and the various frame buffers 61. First the window for the current daemon of interest is registered. To register a window means to inform the X/OGL Server that the window will perform DHA operations. At step 75 the device path for the frame buffer associated with the current daemon is determined. At step 76 is obtained an identifier for the associated shared memory segment 60. This loop (74, 75, 76) is repeated until all daemons have been processed.

After all the daemons have been processed, the 3D rendering aspect of the 3D application is enabled, and 3d graphics data and rendering commands become available for processing. Either some action taken by the application or an action taken by the user can cause a window to change its state. Loop 82 responds to changes of window state, and begins at step 77, where the a change of state is detected. If there has been a change of window state step 78 determines which daemons are associated with the window whose state has changed. Steps 79 and 80 comprise a loop that, for each daemon associated with the changed window, the X/OGL server gets and then passes to the daemon the clip list for the portion of the window on that daemon. The daemon stores that clip list and later uses it during step 81 as it processes stuff in buffers 43 and 59.

In conclusion, it will be appreciated that, while we have disclosed the invention in an embodiment that employs OpenGL, other 3D rendering libraries and their API's could be used in place of OpenGL. Some corresponding minor changes in system architecture might be needed. For example, OpenGL uses what we have termed OGL Daemons to process the rendering data originating at the 3D application. There are 3D libraries for which, instead of using multiple copies of a daemon, would manage multiple frame buffers directly, after that fashion of SLS using multiple DDX's. The key point is to establish and maintain a direct (DHA) connection between the rendering library and the individual frame buffers for the various SLS monitors.

We claim:

1. A 3D graphics system comprising:
   a computer containing a plurality of frame buffers;
   a plurality of monitors respectively coupled to the plurality of frame buffers;
   an X client including an unmodified 3D application program, the X client executing on the computer;
   a single logical screen X server executing on the computer; and
   a 3D rendering library executing on the computer and having direct hardware access connections to each of the plurality of frame buffers.

2. The system of claim 1, wherein the SLS X server communicates with multiple instances of a single daemon.

3. The system of claim 2, wherein the multiple instances of a single daemon are in communication with each of the plurality of frame buffers, respectively.

4. The system of claim 2, wherein the SLS X server communicates with multiple instances of a single daemon via a master daemon.

5. The system of claim 2, wherein each of the multiple instances of a single daemon communicate through common shared memory segments.

6. The system of claim 4, wherein the SLS X server communicates with at least one slave daemon via a master daemon.

7. The system of claim 6, wherein the SLS X server, the X client and all daemons are interconnected with separate control and data paths.

8. The system of claim 6, wherein 3D rendering commands are encapsulated for extraction by each of the at least one slave daemon and the master daemon, respectively.

9. The system of claim 6, wherein 3D rendering commands are responsive to a 3D rendering trigger that identifies a respective buffer for each of the daemons and that communicates to the master daemon whether it needs to trigger that at least one slave daemon.

10. The system of claim 1, wherein the 3D rendering library is selected from the group consisting of OpenGL, Starbase, programmer's hierarchical interactive graphics system (PHIGS), and PHIGS extension to X Windows (PEX).

11. A 3D graphics system, comprising:
    means for controllably distributing display information among a plurality of display monitors, wherein the plurality of display monitors behaves as a single logical screen; and
    means for controllably distributing 3D rendering commands to a plurality of frame buffers each associated with a respective display monitor, the plurality of frame buffers configured to support the operation of a single logical screen, wherein the 3D rendering commands are distributed from a shared memory device.

12. The system of claim 10, wherein the means for controllably distributing 3D rendering commands comprises a master daemon in communication with at least one slave daemon.

13. The system of claim 11, wherein the means for controllably distributing 3D rendering commands comprises a master daemon in communication with a shared memory device.

14. The system of claim 13, wherein the master daemon is responsive to a start command that comprises information indicative that the master daemon needs to propagate the start command to at least one slave daemon and the identity of a command source buffer from which the master and the at least one slave daemon are to receive commands.

15. A method of 3D rendering in a multiple monitor 3D graphics system, comprising:
    querying a single logical screen status;
    determining if the single screen logical status indicates a 3D rendering is in order;
    providing identifiers for each of a plurality of multiple instances of a single daemon, wherein each of the plurality of daemons is associated with a respective monitor;
    storing appropriate 3D rendering commands in a shared memory;
    determining the device path for the frame buffer associated with the current daemon;
    determining an associated shared memory segment for the current daemon;
    determining if a window state has changed, if the determination is negative, processing the commands in a 2D graphics buffer and a 3D fast rendering buffer, if the determination is positive, determine which daemons are associated with the window; and
    passing the clip list for the associated daemon.

16. The method of claim 15, wherein the 3D fast rendering buffer is implemented with a shared memory.

17. The method of claim 15, wherein each of the plurality of daemons is in communication with dedicated frame buffer for the respective monitor.

18. The method of claim 17, wherein each of the plurality of daemons is in communication with a dedicated frame buffer for the respective monitor via a direct hardware access.

19. A computer-readable medium having a computer program, said computer program comprising:
    analyzing logic configured to determine if a 3D rendering is necessary for at least one frame buffer in communication with a computing device, the computing device configured to support a plurality of frame buffers configured to operate as a single frame buffer for generating a single logical screen;
    logic configured to provide identifiers to each of a plurality of multiple instances of a single daemon, wherein each of the plurality of daemons is associated with a respective frame buffer;
    storing logic configured to store 3D rendering commands in a shared memory; and
    logic configured to manage the distribution of 3D rendering commands to the plurality of frame buffers, wherein the 3D rendering commands are distributed from the shared memory device.

20. The computer readable medium of claim 19, wherein the logic configured to manage 3D rendering command distribution comprises logic configured to select between at least a 3D fast rendering buffer and a display command buffer.

* * * * *

UNITED STATES PATENT AND TRADEMARK OFFICE
CERTIFICATE OF CORRECTION

| | |
|---|---|
| PATENT NO. | : 6,417,849 B2 |
| APPLICATION NO. | : 09/127773 |
| DATED | : July 9, 2002 |
| INVENTOR(S) | : Kevin T. Lefebvre et al. |

It is certified that error appears in the above-identified patent and that said Letters Patent is hereby corrected as shown below:

Claim 15, Column 8, line 7, delete "of" and insert therefor --for--

Signed and Sealed this

Eighth Day of September, 2009

David J. Kappos
*Director of the United States Patent and Trademark Office*